(12) United States Patent
Lehner et al.

(10) Patent No.: US 10,011,064 B2
(45) Date of Patent: Jul. 3, 2018

(54) METHOD FOR PRODUCING A PLASTIC BOTTLE, AND PREFORM AND BLOWING MOLD SUITED THEREFOR

(71) Applicant: Alpla Werke Alwin Lehner GmbH & Co. KG, Hard (AT)

(72) Inventors: Alwin Lehner, Hard (AT); Johann Künz, Hard (AT); Markus Düringer, Fussach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 846 days.

(21) Appl. No.: 14/319,323

(22) Filed: Jun. 30, 2014

(65) Prior Publication Data

US 2014/0314984 A1     Oct. 23, 2014

Related U.S. Application Data

(62) Division of application No. 11/661,930, filed as application No. PCT/EP2005/008971 on Aug. 19, 2005, now Pat. No. 8,790,568.

(30) Foreign Application Priority Data

Sep. 10, 2004  (CH) ..................... 1494/04
Dec. 7, 2004   (CH) ..................... 2025/04

(51) Int. Cl.
*B29C 49/00*    (2006.01)
*B29C 49/48*    (2006.01)
(Continued)

(52) U.S. Cl.
CPC .......... *B29C 49/0073* (2013.01); *B29C 49/48* (2013.01); *B29C 49/58* (2013.01); *B29D 22/003* (2013.01); *B29B 2911/1402* (2013.01); *B29B 2911/1404* (2013.01); *B29B 2911/14026* (2013.01); *B29B 2911/14033* (2013.01); *B29B 2911/1442* (2013.01); *B29B 2911/1444* (2013.01); *B29B 2911/1466* (2013.01); *B29B 2911/14106* (2013.01);
(Continued)

(58) Field of Classification Search
None
See application file for complete search history.

(56) References Cited

U.S. PATENT DOCUMENTS 3,412,186 A   11/1968  Piotrowski
4,615,667 A   10/1986  Roy
(Continued)

FOREIGN PATENT DOCUMENTS

JP        54-86560 A    7/1979
WO        WO 98/52729 A1    11/1998

*Primary Examiner* — Monica Huson
(74) *Attorney, Agent, or Firm* — Buchanan Ingersoll & Rooney, PC

(57) ABSTRACT

Method for producing a plastic bottle, and preform and blowing mold suited therefore are disclosed. An exemplary process can produce a plastic bottle, for example, a PET bottle. Such a bottle can be produced from a preform which has a body which is closed on one side, which is connected to a neck section with a pour opening, in which the preform which has been produced in a plastic injection process or an extrusion process is placed in the mold cavity of a blow mold and inflated using the blow nozzle by overpressure according to the mold cavity. Sealing can take place between the blow nozzle and the preform within the preform.

18 Claims, 2 Drawing Sheets

(51) Int. Cl.
  *B29C 49/58* (2006.01)
  *B29D 22/00* (2006.01)
  B29C 49/12 (2006.01)
  B29C 49/42 (2006.01)
  B29K 23/00 (2006.01)
  B29K 27/06 (2006.01)
  B29K 67/00 (2006.01)
  B29L 31/00 (2006.01)

(52) U.S. Cl.
  CPC ............... *B29B 2911/14133* (2013.01); *B29B 2911/14213* (2013.01); *B29B 2911/14326* (2013.01); *B29B 2911/14328* (2015.05); *B29B 2911/14331* (2015.05); *B29B 2911/14333* (2013.01); *B29B 2911/14335* (2015.05); *B29B 2911/14337* (2015.05); *B29B 2911/14426* (2013.01); *B29C 49/12* (2013.01); *B29C 49/4205* (2013.01); *B29C 2049/4294* (2013.01); *B29K 2023/065* (2013.01); *B29K 2023/12* (2013.01); *B29K 2027/06* (2013.01); *B29K 2067/00* (2013.01); *B29L 2031/716* (2013.01); *Y10T 428/1397* (2015.01)

(56) References Cited

U.S. PATENT DOCUMENTS

| | | |
|---|---|---|
| 6,264,050 B1 | 7/2001 | Darr et al. |
| 6,273,705 B1 | 8/2001 | Schoch |
| 2002/0037338 A1 | 3/2002 | Lisch et al. |

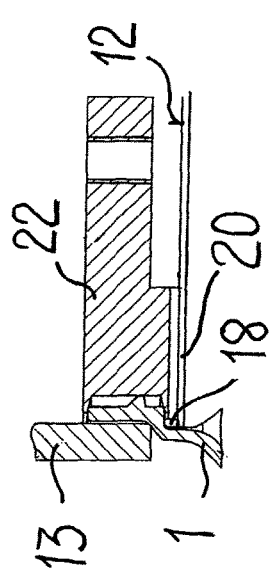
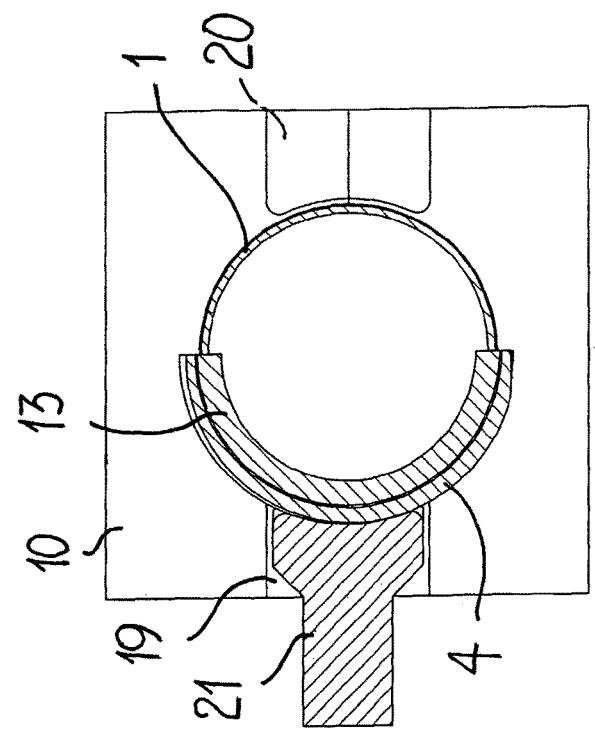
Fig. 4
Fig. 5
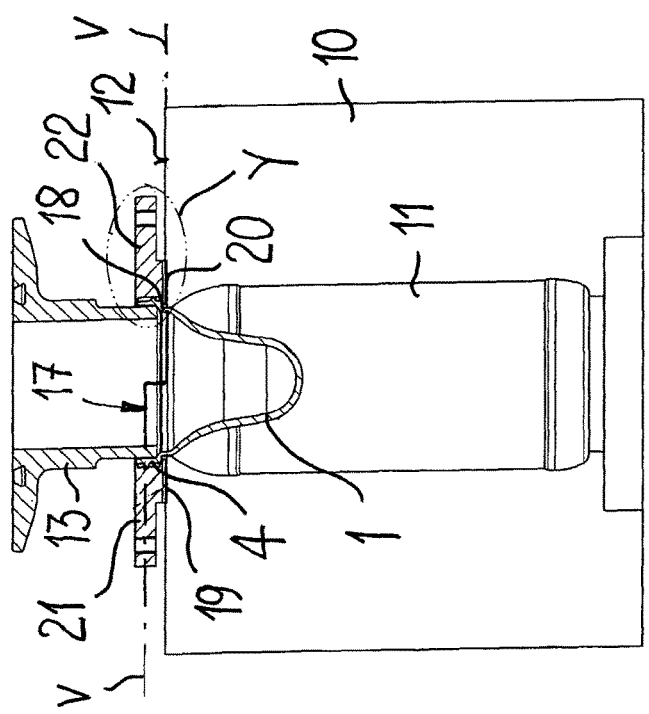
Fig. 3

METHOD FOR PRODUCING A PLASTIC BOTTLE, AND PREFORM AND BLOWING MOLD SUITED THEREFOR

The invention relates to a process for producing a plastic bottle, especially a PET bottle, in a blow molding or stretch blow molding process. Furthermore, the process also relates to a preform and a blow mold made for use of the preform.

Containers conventional in the past, of white or colored sheet metal, of glass or also ceramic are being increasingly replaced by plastic containers. Mainly plastic containers are used for packaging of bulky substances, for example cleaning products, body care products, cosmetics, motor vehicle fluids, etc. The low weight and lower costs certainly play a not inconsiderable part in this substitution. The use of recyclable plastic materials and altogether more favorable overall energy balance in their production also contribute to promoting the acceptance of plastic containers, especially plastic bottles, among consumers.

The most frequently used plastic bottles consist of polyethylene terephthalate or PET and are produced in a so-called injection blow molding or injection stretch blow molding process. This process is a combination of injection molding and blow molding. First, a preform is produced in the injection mold in the injection molding process. Recently extrusion processes have also been suggested for producing preforms. The preform has an essentially oblong, cylindrical body and is made closed on one lengthwise end. A support ring separates the body from the neck section with a pour opening. This neck section conventionally already has the later shape of the bottle neck. On the outside of this neck section in general threaded sections or the like are formed for fixing a closure part. After its production in an injection molding process, the preform is removed from the injection mold, if necessary conditioned, and placed in the blow mold of a blow molding machine in which it is finally inflated with overpressure to the desired shape. In the injection stretch blow molding process the injected preform is additionally stretched in the blowing process with a stretching mandrel. An injection blow molding process is already known in which the blow molding process takes place directly following the injection of the preform. The preform remains on the injection mandrel in doing so, and part of the injection mold forms a section of the blow mold.

The support ring is used to transport the preform in the blow molding machine and for supporting the preform on the surface of the blow mold. In one type of blow molding machine the surface of the support ring at the same time forms a sealing surface for the mouth of the blowing mandrel of the blow molding machine. But this dictates a blow nozzle with a relatively large diameter, since the part of the neck section projecting over the support ring must be held by the blow nozzle. If it is considered that on the outer surface of the neck section threaded sections or the like are already formed, it is immediately apparent that the inside diameter of the blow nozzle must be made very large, so that the neck section cannot be damaged. In plastic bottles with large pour openings, this leads to blow nozzles with overly large diameters. The sealing of the blow nozzle on the circular ring surface of the support ring must take place with relatively large applied pressures in order to prevent escape of the inflation medium, conventionally air. In case of wear, non-uniformities or damage to the blow nozzle, adequate sealing is often difficult to achieve for the surfaces acting on one another. The problems with dimensional stability in the production processes of the prior art are usually exacerbated by the temperature difference between the body of the preform located within the mold cavity and the neck section protruding out of the mold cavity.

Aside from its support function in transport of the preform in the blow molding machine and on the surface of the blow mold and optionally for sealing the blow nozzle, the support ring on the finish-blown container, for example a plastic bottle, does not have any function. On the other hand, in large-scale industrial production of plastic containers, especially plastic bottles, reducing production costs is always a concern.

The object of this invention is therefore to eliminate the described disadvantages of the prior art. The costs for producing a plastic container, especially a plastic bottle, in an injection blow molding or injection stretch blow molding process, are to be able to be reduced. Damage to the sealing surface of the manufactured plastic bottle will be prevented. In this connection blow nozzles with oversized mouths will be avoided. During the blow molding process, a good seal between the preform and the blow nozzle will be ensured. Simple transport of the preform within the blow molding machine and its insertability into the blow mold will be guaranteed. The finish-inflated plastic container will be simple to remove from the mold in a controlled manner.

The invention suggests a process for producing a plastic bottle, especially a PET bottle, in which a preform which has a body which is closed on one side, which is connected to a neck section with a pour opening, and which is produced in a plastic injection process or an extrusion process is placed in the mold cavity of a blow mold and inflated using the blow nozzle by overpressure according to the mold cavity. To distinguishing from the processes known from the prior art, sealing takes place between the blow nozzle and the preform within the preform.

By sealing taking place within the preform, deformations of the neck section, especially of the end surface surrounding the pour opening, are avoided. Compared to the process versions in which sealing takes place on the surface of the peripheral support ring, the process as claimed in the invention has the advantage that the blow nozzle has a much smaller diameter. Since sealing now takes place in the interior of the preform, the blow nozzle need no longer accommodate the neck section of the preform located above the support ring. In this way, the danger of damage to the threaded sections provided on the outside of the neck section or the like is eliminated. The dimensions of the blow nozzle can be kept small by the process guidance as claimed in the invention also in the production of plastic bottles with larger diameters of the pour opening. This has advantages with respect to formation of the blow nozzle, with respect to the required applied pressure forces, and also with respect to the media pressures required for the blow molding process. The wall thickness in the neck section can also be reduced by sealing within the preform. A peripheral support ring which separates the body of the preform from the neck section can be completely omitted. This leads to a not inconsiderable saving of material which benefits production costs of plastic bottles.

Sealing between the blow nozzle and the preform within the preform takes place advantageously by annular contact of the mouth of the blow nozzle with the inside surface in the neck section of the preform. Sealing also takes place in the process as claimed in the invention solely by direct contact of the seal partners.

It is also advantageous if sealing between the blow nozzle and the preform takes place in a transition region of the neck section to the cylindrical body of the preform. In the transition region the preform has increased stiffness. In this way unwanted deformations can be better avoided.

The inner surface of the neck section used for sealing is advantageously the surface of a cone. In the interaction of the cone surface with the edge of the mouth of the blow mold, there is contact essentially along a line. The applied pressure force of the blow nozzle can be adjusted such that the edge of the mouth is pressed slightly into the surface of the cone. This has the advantage that it can be checked by pressing on the finish-blown plastic bottle whether the blow nozzle is correctly adjusted or has damage.

The inner surface of the preform used for sealing can also be an annular surface which runs perpendicular to the axis of the preform. In this case, sealing over line contact is advantageous. For this purpose, the edge of the mouth of the blow nozzle is correspondingly sharp or is provided with a radius.

The process as claimed in the invention with sealing within the preform is suited both for a blow molding processes and also for the stretch blow molding process in which the preform is additionally stretched with a stretching mandrel for inflation.

The invention also proposes a preform for executing the process as claimed in the invention. The preform has an oblong body with one lengthwise end which is made closed, and on its other lengthwise end a neck section with a pour opening is formed. To distinguish from known preforms, the neck section has a greater outside diameter than the body and a support surface is formed on the transition from the body to the neck section.

The greater diameter of the neck section and the support surface on the transition from the neck section to the body of the preform make it possible to omit the peripheral support ring which separates the body from the neck section in the known preforms. The preform is supported with the support surface on the surface of the blow mold. Only the body projects into the blow mold cavity. The greater outside diameter of the neck section prevents the preform from falling into the mold cavity. The greater diameter of the neck section also facilitates movement of the blow nozzle into the interior of the preform in order to form a seal here.

The support surface made on the preform is advantageously an annularly peripheral shoulder. The peripheral shoulder for the new preform assumes the function of the peripheral support ring known from preforms of the prior art with an essentially radial alignment. In this way, the new preform can be easily inserted without further modifications into existing blow molds. The peripheral shoulder is also used to transport the preform to the various stations. In this connection the existing transport system can continue to be used. It goes without saying that the support surface can also be made as the surface of a cone if necessary.

The neck section which is larger in terms of outside diameter results in that the preform at least in the region bordering the pour opening has a greater inside diameter than the body. The greater inside diameter facilitates insertion of the blow nozzle. This geometrical execution results in a transition to a smaller inside diameter of the body of the preform which is used for sealing. This transition can be made as a peripheral radial surface. It is advantageous if the inner surface of the neck section in the transition region to the body of the preform is made as the surface of a cone. The cone surface enables very reliable sealing of the blow nozzle with the inside surface of the preform. In this connection the contact of the sealing partners takes place over a line. The applied pressure force of the blow nozzle can ensure that the edge of the mouth of the blow nozzle is imaged on the inner surface and is also visible on the finish-blown plastic bottle. In this way simple control is obtained via the adjustment of the blow nozzle and mechanical composition of the contact regions.

For simple production of plastic bottles with relatively wide openings the preform has a pour opening with an opening diameter of roughly 35 mm to roughly 95 mm. These wide-neck bottles can only be produced with difficulty using conventional processes. Their production dictates special blow nozzles and always entails the danger of damage to the neck section by applied pressure on the blow nozzle.

The materials for the preform can be all materials suited for an injection blow molding or injection stretch blow molding process. For example they include PET, PET-G, HDPE, PP, PVC or also filled plastics. Preferably the preform is produced in a plastic injection process or also in an extrusion process from PET.

A blow mold which is made especially for a preform as claimed in the invention has at least two mold parts which can be moved out of a closed into an open position and vice versa. In most cases the blow mold consists of two mold halves. The mold parts border a mold cavity which has a mouth on the top of the blow mold. A support bridge which runs in the peripheral direction for the preform borders the mouth. On the top of the blow mold there are at least two groove-shaped recesses which run essentially radially and end on the support bridge for the preform. The groove-shaped recesses are made to hold grippers which can be advanced.

The blow mold made as claimed in the invention is made especially for use of preforms without a support ring. The support surface of the preform which has been inserted into the blow mold is supported on the support bridge which borders the mouth of the mold cavity. The radially running recesses on the surface of the blow mold are used to hold grippers and make it possible for the preform which rests with its support surface on the grippers to be reliably inserted into the mold cavity. To remove the inflated plastic container, the grippers can be advanced in the recesses, their being able to slide under the support surface of the section of the preform or container neck projecting out of the mold cavity.

For reasons of space there are advantageously two groove-shaped recesses which are diametrically opposite one another. The groove-shaped recesses have a width which extends on the support bridge in its peripheral direction over an angle of roughly 10° to roughly 45°. In this way the grippers can have a shape which is matched to the peripheral outline of the section of the preform or of the finish-blown plastic container projecting out of the mold cavity. This allows careful treatment of the preform or of the finish-blown container.

In the advance of the grippers the groove-shaped recesses on the top of the blow mold moreover form radial guides. In this way, if necessary accurate positioning of the preform in the mold cavity is enabled.

For large-scale industrial production of plastic containers, the blow mold is made as a multiple mold with a plurality of mold cavities. Here each mold cavity has a mouth on the top of the blow mold. In each mouth region there are groove-shaped recesses for holding the grippers. This allows simultaneous feeding of the mold cavity with preforms and simultaneous removal of the finish-blown plastic containers. The groove-shaped recesses run essentially parallel to one another. This ensures that the grippers cannot hinder one another.

Other advantages and features of the invention will become apparent from the following description in conjunction with the schematics which are not to scale.

FIG. 3 shows an axial section of a blow mold with preform which has been inserted into the mold cavity, including grippers and blow nozzle;

FIG. 4 shows an enlarged detail of the section Y shown by the broken line in FIG. 3; and FIG. 5 shows a cross section of the blow mold according to the cutting line V-V in FIG. 3.

Figure 1:
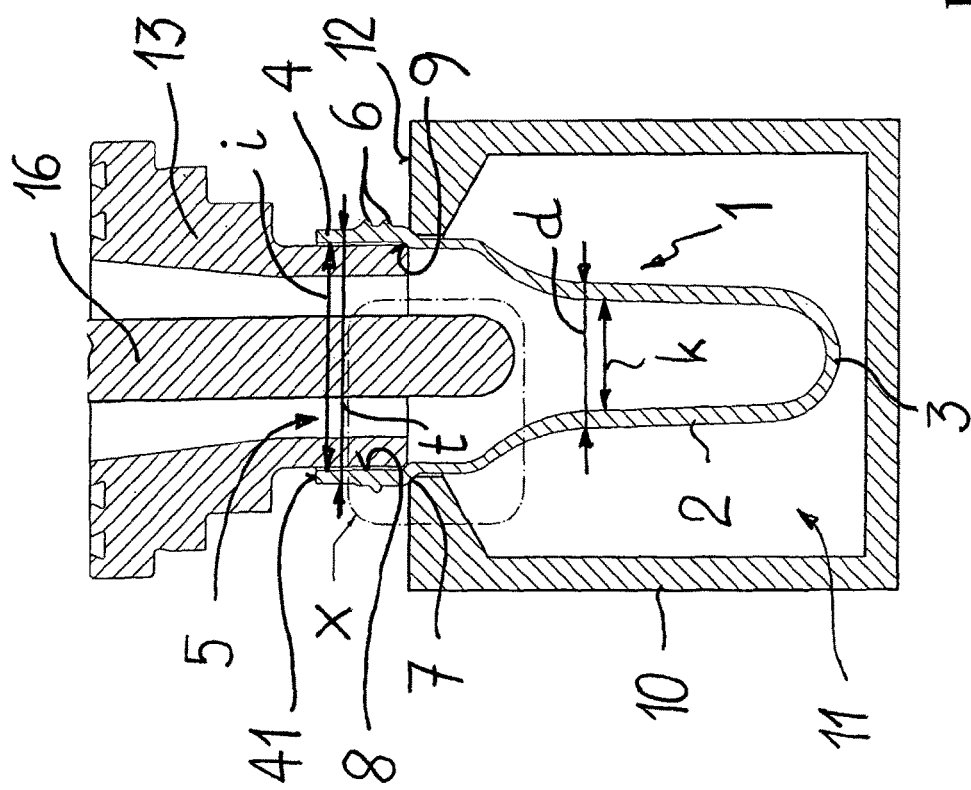
FIG. 1 shows a preform inserted into a blow mold, with an attached blow nozzle.

The preform 1 shown in FIG. 1 has an oblong body 2 with one lengthwise end 3 made closed. On the opposing lengthwise end a neck section 4 with a pour opening 5 is formed. On the outside of the neck section 4 threaded sections 6 are formed which are used for fixing a sealing cap or the like on the finish-blown plastic bottle. FIG. 1 shows that the body 2 has an outside diameter d which is smaller than the outside diameter t of the neck section 4. On the transition from the neck section 4 to the body 2 on the preform 1 there is a peripheral support surface 7 or peripheral annular shoulder. The support surface 7 runs radially in this embodiment of the preform 1. But it can also be made as a cone surface. The support surface 7 is used as an action region for transport means for the preform 1 and as a support surface relative to the blow mold.

The neck section 4 has an inside diameter i which is greater than the inside diameter k of the body 2 of the preform 1. In this connection the inside diameter k of the body 2 of the preform can also be made staggered. The inside diameter i of the neck section 4 in the region of the pour opening 5 for producing so-called wide-neck bottles is for example roughly 35 mm to roughly 95 mm. The neck section 4 has an inside surface 8 which passes into the inner surface of the body 2 in a transition region 9. In the illustrated embodiment of the preform 1, the inner surface 8 in the transition region 9 is made as a cone surface. In alternative versions the inner surface in the transition region can also be made as a radial ring surface. The transition region 9 of the inner surface 8 of the neck section 4 is used in the blow molding process for sealing relative to the blow nozzle.

The preform 1 can consist of all plastics suitable for the injection blow molding or injection stretch blow molding process. For example they include PET, PET-G, HDPE, PP, PVC or also a filled plastic. One preferred material is PET (polyethylene terephthalate). For example, the preform 1 is produced in a plastic injection process or in an extrusion process. The preform 1 can be produced directly prior to the blowing process. The preforms 1 can however also be produced separately and stored until they are needed for producing the plastic bottles.

Figure 2:
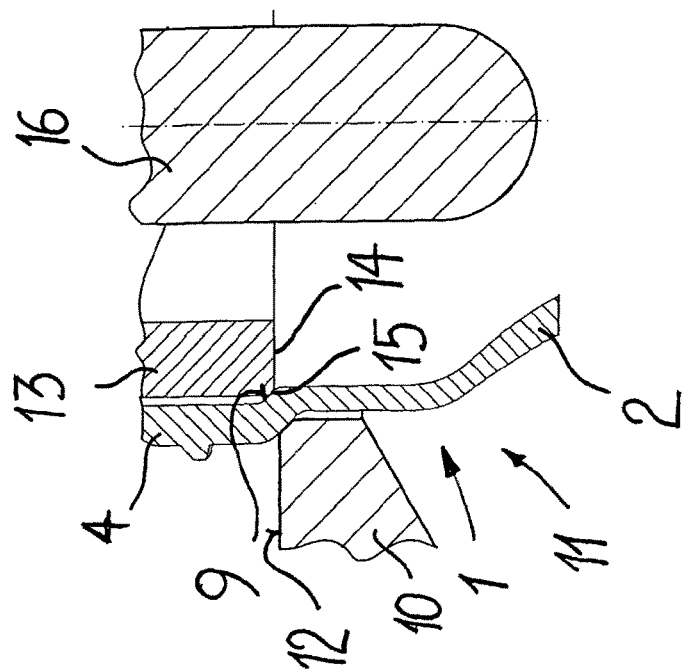
FIG. 2 shows an enlarged detail according to the broken-line frame X in FIG. 1.

As is apparent from FIG. 1 and especially from the detail in FIG. 2, the preform 1 is inserted into a blow mold 10. The blow mold 10 has a mold cavity 11 which fixes the shape of the plastic bottles which are to be inflated. The preform 1 is supported on the surface 12 of the blow mold with the support surface 7 which is made as a ring shoulder. The support surface 7 prevents the preform 1 from falling into the mold cavity 11 of the blow mold. The neck section 4 of the preform 1 extends outside of the mold cavity 11 and is not adversely affected by the blow molding process. In particular, the end surface 41 of the neck section 4 which is used as a sealing surface for the inflated plastic bottle, and the threaded sections 6 which have been made on the outside of the neck section 4 must not be deformed or damaged.

Inflation of the preform 1 is done with blowing pressures of up to 40 bar and more. For this purpose, there must be sufficient sealing between the preform 1 and the blow nozzle 13. According to the new process, sealing takes place within the preform 1. To do this, the blow nozzle 13 is driven into the interior of the preform until the edge 14 of the mouth of the blow mold 13 adjoins the transition section 9 of the inner surface 8 of the neck section 4, which transition section is made as a conical surface. Sealing takes place by line contact between the outer edge 15 of the blow nozzle 13 and the cone surface 9. The applied pressure force of the blow nozzle 13 is selected such that the outside edge 15 of the blow nozzle 13 sinks somewhat into the conical surface 9. This improves sealing and makes it possible to check correct alignment of the blow nozzle 13 and its mechanical composition in the mouth region on the finish-blown plastic bottles. Thus, interruptions of the annular depression of the blow nozzle indicate damage. An incomplete annular impression can indicate required re-alignment of the blow nozzle to the blow mold. As is indicated in FIG. 2, the preform can also be stretched with a stretching mandrel 16 in the axial direction in an injection stretch blowing process, in addition to the blow molding process.

FIG. 3 shows an axial section of the blow mold 10 with the preform 1 inserted into the mold cavity 11. The body 2 of the preform 1 projects into the mold cavity 11, while the neck section 4 of the preform 1 is located above the mouth 17 of the mold cavity 11. The preform 1 is supported with its support surface 7 made as a ring shoulder on a support bridge 18 which surrounds the mouth 17 of the mold cavity 11. The blow nozzle 13 projects into the interior of the preform 11. Its mouth edge 14 adjoins the transition section 9 of the inner surface 8 of the neck section 4, which transition section is made as a cone surface. On either side of the mouth 17 there are groove-like recesses 19, 20 in the surface 12 of the blow mold 10. The groove-like recesses 19, 20 lie roughly diametrically opposite one another and end on the support bridge 18 bordering the mouth 17 of the mold cavity 11. They are used as a guide for the grippers 21, 22 with which the preform 1 is inserted into the mold cavity 11 of the blow mold 10 and the inflated plastic container is removed again. The grippers 21, 22 can be advanced onto the preform 1 in the groove-like recesses 19, 20 and slide under the support surface 7 of the preform 1.

FIG. 4 shows the section Y indicated by the broken lines in FIG. 3 on an enlarged scale. The figure shows that the preform with the support surface 7 is supported on the support bridge 18 surrounding the mouth 17. The blow nozzle is labelled with reference number 18. A gripper 22 is guided in the recess 20 and projects under the support surface 7.

The cross section in FIG. 5 shows the blow mold cut according to the cutting line V-V in FIG. 3. The cutting line V-V runs in the left half of FIG. 5 through the gripper 21 and the preform 1 which is being supported on the support bridge. In the right half of FIG. 5 the cutting line runs along the surface 12 of the blow mold 10. The groove-shaped recesses in the surface 12 of the blow mold are labelled with reference numbers 19 and 20. The groove-shaped recesses 19, 20 each have a width which extends on the support bridge over an angular range of roughly 10° to roughly 45°. This figure shows that the gripper 21 on its free end has a shape which is matched to the peripheral outline of the neck section 4 which projects out of the mold cavity.

By sealing taking place between the preform and the blow nozzle within the preform, deformations of the neck section, especially of the end surface surrounding the pour opening, are avoided. Compared to the process versions in which sealing takes place on the top of the peripheral support ring, the process as claimed in the invention has the advantage that the blow nozzle has a much smaller diameter. Since sealing now takes place within the preform, the blow nozzle need no longer hold the neck section of the preform located above the support ring. This eliminates the danger of damage to the threaded sections provided on the outside of the neck section or the like. The dimensions of the blow nozzle can be kept small by the process guidance as claimed in the invention also in the production of plastic bottles with larger diameters of the pour opening. This has advantages with respect to formation of the blow nozzle, with respect to the required applied pressure forces, and also with respect to the media pressures required for the blow molding process. The wall thickness in the neck section can also be reduced by sealing within the preform. A peripheral support ring which separates the body of the preform from the neck section can be completely omitted. This leads to a not inconsiderable saving of material which benefits the production costs of plastic bottles.

The invention claimed is:

1. Preform for producing plastic bottles in a blow molding or stretch blow molding process, the preform comprising:
    an essentially cylindrical, oblong body with one lengthwise end which is made closed;
    a neck section arranged on an other lengthwise end of the preform, the neck section including a pour opening, and having a greater outside diameter than the body;
    a first transition from the body to the neck section;
    a second transition formed between the first transition and the one lengthwise end of the preform, and a support surface is formed on the second transition, wherein the preform is free of any peripheral support ring separating the body of the preform from the neck section.

2. Preform as claimed in claim 1, wherein the support surface is an annular, peripheral shoulder.

3. Preform as claimed in claim 1, wherein the neck section at least in the region bordering the pour opening has a greater inside diameter (i) than the body.

4. Preform as claimed in claim 3, wherein the inner surface of the neck section in the transition region to the body of the preform is made as the surface of a cone.

5. Preform as claimed in claim 1, wherein the neck section in the region of the pour opening has an inside diameter (i) from roughly 35 mm to roughly 95 mm.

6. Preform as claimed in claim 1, wherein it is produced in a plastic injection process from PET, PET-G, HDPE, PP, PVC or also from a filled plastic.

7. Preform for use in a production process for plastic bottles as claimed in claim 1.

8. Preform as claimed in claim 1, wherein the preform is produced in a plastic injection process or in an extrusion process for storage until it is needed for producing a plastic bottle.

9. Preform as claimed in claim 1, wherein the greater diameter of the neck section and the support surface make it possible to omit the peripheral support ring.

10. Preform as claimed in claim 1, wherein the support surface is made as a ring shoulder.

11. Preform as claimed in claim 1, wherein the support surface is configured to support the preform exclusively with the support surface on a surface of a blow mold.

12. Preform as claimed in claim 1 wherein the preform is inserted in a blow mold which has a cavity, wherein the preform is configured to be supported on a support bridge of the blow mold with the support surface.

13. Preform as claimed in claim 12, wherein the preform is configured to be supported with the support surface on the surface of a blow mold, so that the greater outside diameter of the neck section prevents the preform from falling into the mold cavity.

14. Preform as claimed in claim 12, wherein the support bridge borders the mouth of the mold cavity.

15. Preform as claimed in claim 12, wherein the neck section of the preform extends outside of the mold cavity and is not adversely affected by the blow molding process.

16. Preform for producing a plastic bottle, wherein the preform comprises:
    a body, which is closed on one side;
    a neck section connected to the body and including a pour opening, wherein the body has an outside diameter (d) which is smaller than the outside diameter (t) of the neck section;
    a first transition from the neck section to the body;
    a second transition formed between the pour opening and the first transition, the second transition configured as a peripheral annular shoulder for transport of the preform and as a support surface relative to a blow mold, wherein the preform is free of any peripheral support ring separating the body of the preform from the neck section.

17. Preform as claimed in claim 16 wherein the neck section has an inside diameter (i) which is greater than the inside diameter k of the body.

18. Preform for producing plastic bottles in a blow molding or stretch blow molding process, the preform comprising:
    an essentially cylindrical, oblong body with one lengthwise end which is made closed;
    a neck section arranged on an other lengthwise end of the preform, the neck section including a pour opening, and having a greater outside diameter than the body;
    a first transition from the body to the neck section;
    a second transition formed between the first transition and the one lengthwise end of the preform, and a support surface is formed on the second transition, wherein the preform is free of any peripheral support ring separating the body of the preform from the neck section, wherein the support surface is configured to support the preform exclusively with the support surface on a surface of a blow mold.

* * * * *